United States Patent

Martin

[15] 3,656,930

[45] Apr. 18, 1972

[54] MOSS PEAT CAKE FOR HORTICULTURE

[72] Inventor: James Martin, Dublin, Ireland
[73] Assignee: Bord NA Mona, Dublin, Ireland
[22] Filed: Sept. 22, 1970
[21] Appl. No.: 74,530

Related U.S. Application Data

[63] Continuation of Ser. No. 665,997, Sept. 7, 1967, abandoned.

[52] U.S. Cl. ................................................71/24, 71/64 A
[51] Int. Cl. ..............................................................C05f 11/02
[58] Field of Search ............................71/1, 24, 64; 264/109

[56] References Cited

UNITED STATES PATENTS 1,988,307  1/1935  Fay.............................................71/24
2,019,824  11/1935  Liehr et al. ................................71/24
2,178,051  10/1939  Sams...........................................71/24
3,231,365  1/1966  Wahlberg....................................71/24

Primary Examiner—Charles N. Hart
Attorney—Young & Thompson

[57] ABSTRACT

Peat moss is prepared in the form of coherent cakes by drying granulated moss peat until the moisture content thereof is reduced to 10 to 30 percent by weight, and then compressing the thus-dried moss peat in a mold at a pressure between 1 and 4 British tons/in.$^2$ until upon releasing the pressure the moss peat has the form of a cake having between one-sixth and one-twelfth its bulk size before compression. The coherent cake is easily reconstituted by wetting, and to this end may include a non-ionic wetting agent.

5 Claims, No Drawings

MOSS PEAT CAKE FOR HORTICULTURE

This application is a streamlined continuation of my copending application Ser. No. 665,977, filed Sept. 7, 1967, and now abandoned.

This invention concerns the treatment of peat, particularly moss peat, for horticulture and other purposes.

The usefulness of peat, particularly sphagnum moss peat, in plant cultivation generally is well known but one of the factors which affects the cost and convenience of use of this material is its bulk and friability which restricts the quantity of moss peat material which can be stored or transported in any given space as well as rendering the handling of the material laborious, dusty and otherwise inconvenient. For the purpose of transport it is usual to press the loose moss peat into a relatively coherent mass in the form of bales which weigh about 15 lb. per cubic foot, these bales being secured by wooden slats suitably wired in position, and on removal of which the moss peat may be readily broken up and restored to its original granular or fragmentary condition. In this method of treatment the loose moss peat is customarily compressed to about one-third its loose bulk to give it the necessary coherence as a bale. As an alternative to baling the moss peat, for example where it is supplied in small quantities for immediate use as required, it may be packed loosely into plastic or paper bags. This is particularly uneconomical from the point of view of the utilisation of available space for storage or transport. There is also difficulty in effectively wetting loose moss peat especially in bulk.

The present invention has for its object to counteract the disadvantages above mentioned and enable moss peat to be handled more cleanly and efficiently than hitherto without in any way reducing the advantages and versatility normally possessed by moss peat in horticulture and the like.

According to the invention moss peat is produced in the form of coherent cakes by first drying the moss peat in its comminuted or granular condition and then subjecting it to pressure such that on releasing said pressure the moss peat is obtained in the form of a cake having between one-sixth and one-twelfth its bulk size before compression. That is to say, a quantity of loose moss peat placed in a mold having a base area of, for example, 6 inches by 6 inches and a depth of 12 inches is compressed to form a cake 6 inches by 6 inches by 1 to 2 inches thickness.

The cakes thus formed may be readily transported or stored until required for use, whereupon the moss peat may be readily restored to its original bulk and fragmentary condition merely by wetting it. In order to facilitate the recovery of the bulk, however, according to a further feature of the invention, a non-ionic wetting agent may be intimately mixed with the loose moss peat before compression. Suitable wetting agents for the purpose are sold under the names "Nonidet P40" "Berol VMA-09," the quantity of which preferably lies between 0.05 and 0.5 percent of the dry moss peat by weight. The wetting agent has no deleterious effect upon the moss peat as a horticultural medium.

In preparing the moss peat cakes according to the invention, the moss peat in the lose condition in which it is normally suitable for use in horticulture or the like is passed (preferably whirled) through a drying conveyor duct such as in a cyclone or gas dryer or a steam heated dryer to reduce its moisture content to 10 to 30 percent by weight, the moss peat temperature not being allowed to exceed 65° C during the drying process. A measured quantity of the wetting agent is introduced into the stream of dried moss peat and is intimately mixed throughout the moss. If desired other chemical additives, for example such as may be required to render the treated moss peat especially advantageous for use as a growing medium, may also be added to the peat after passing through the dryer. The molds in which the moss peat is to be compressed are then filled to the required height and a pressure, preferably of the order of 1 to 4 British tons per square inch, applied to the moss peat until it is compressed to about one-fourteenth of its original volume. Upon releasing the pressure a slight expansion will occur so that finally the resultant cake of moss peat, which is quite hard like a brick, has approximately one-sixth to one-twelfth its original volume.

The cakes or bricks of compressed moss peat, which advantageously weigh from one-half to 6 lb., may be readily handled without fear of breaking up and they are preferably enclosed in a waterproof wrapping and sealed to prevent any accidental access of moisture until such time as the moss peat may be required for use as such. It will be appreciated that in this compressed and packed condition the moss peat may be stored or transported much more conveniently and efficiently than in its customary loose or baled form. The moss peat in the form of cakes may also be used with great advantage in preference to the loose moss peat, especially where the elimination of dust is desirable. For example, the cakes removed from their wrapping may be laid directly in stalls and fowl houses for use as litter, in which case the moss peat will resume its loose and fragmentary condition naturally in the course of time without creating a dusty atmosphere such as usually attends the application of moss peat for such purposes.

When it is desired to use the moss peat for a horticultural purpose, for example as a compost ingredient or soil conditioner, it is only necessary to remove the waterproof wrapping from the compressed cake and to reconstitute the original uncompressed volume of loose fragmented moss peat by adding approximately a similar weight of water whereupon it can be used in the normal way. The water may be added either by spraying in situ or by immersing the cakes in a receptacle. Fully saturated moss peat can be obtained by the addition of a greater volume of water related to the absorptive capacity of the moss peat itself.

I claim:

1. A method of preparing moss peat in the form of coherent cakes, comprising the steps of drying granulated moss peat until the moisture content thereof is reduced to 10 to 30 percent by weight, placing thus-dried moss peat in a compression mold, and applying to the peat in the mold a pressure of between 1 and 4 British tons per square inch until upon releasing the pressure the moss peat has the form of a cake having between one-sixth and one-twelfth its bulk size before compression.

2. A method as claimed in claim 1, in which the moss peat is compressed in said mold to about one-fourteenth of its original volume prior to release of said pressure.

3. A method as claimed in claim 1, and intimately mixing a non-ionic wetting agent with the loose moss peat after drying but before compression thereof.

4. A method as claimed in claim 3, the amount of said wetting agent being between 0.05 and 0.5 percent by weight of the dry moss peat.

5. A method as claimed in claim 1, and maintaining the temperature of the moss peat below 65° C. during said drying.

* * * * *